US007743023B2

(12) United States Patent
Teodosiu et al.

(10) Patent No.: US 7,743,023 B2
(45) Date of Patent: Jun. 22, 2010

(54) SCALABLE FILE REPLICATION AND WEB-BASED ACCESS

(75) Inventors: Dan Teodosiu, Kirkland, WA (US); David C. Steere, Bellevue, WA (US); Muthukaruppan Annamalai, Bellevue, WA (US); Nikolaj S Bjorner, Woodinville, WA (US); Michael J Bohlander, Redmond, WA (US); Huisheng Liu, Sammamish, WA (US); Patrick E Bozeman, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 133 days.

(21) Appl. No.: 11/275,870

(22) Filed: Feb. 1, 2006

(65) Prior Publication Data

US 2007/0185932 A1     Aug. 9, 2007

(51) Int. Cl.
*G06F 7/00* (2006.01)
*G06F 17/30* (2006.01)

(52) U.S. Cl. .......................... 707/612; 707/614; 714/6; 714/15

(58) Field of Classification Search ........................ None
See application file for complete search history.

(56) References Cited

U.S. PATENT DOCUMENTS

| | | | | |
|---|---|---|---|---|
| 4,934,823 A | * | 6/1990 | Okami | 345/530 |
| 5,566,331 A | * | 10/1996 | Irwin et al. | 707/10 |
| 5,953,729 A | * | 9/1999 | Cabrera et al. | 707/204 |
| 6,460,055 B1 | * | 10/2002 | Midgley et al. | 707/204 |
| 6,553,391 B1 | | 4/2003 | Goldring et al. | |
| 6,785,882 B1 | * | 8/2004 | Goiffon et al. | 717/120 |
| 6,874,001 B2 | * | 3/2005 | Narang et al. | 707/203 |
| 2001/0018686 A1 | * | 8/2001 | Nakano et al. | 707/10 |
| 2002/0099728 A1 | | 7/2002 | Lees et al. | |
| 2002/0143798 A1 | * | 10/2002 | Lisiecki et al. | 707/200 |
| 2002/0143888 A1 | * | 10/2002 | Lisiecki et al. | 709/214 |
| 2002/0147774 A1 | * | 10/2002 | Lisiecki et al. | 709/203 |
| 2002/0174103 A1 | | 11/2002 | Hsiao et al. | |
| 2003/0037029 A1 | * | 2/2003 | Holenstein et al. | 707/1 |

(Continued)

FOREIGN PATENT DOCUMENTS

EP    1462960    9/2004

OTHER PUBLICATIONS

Alex Sim, Junmin Gu, Arie Shoshani, and Vijaya Natarajan, DataMover: Robust terabyte-scale multi-file replication over wide-area networks, Lawrence Berkeley National Laboratory, University of California, 2004, Paper LBNL' 54854.*

(Continued)

*Primary Examiner*—Pierre M Vital
*Assistant Examiner*—Augustine Obisesan
(74) *Attorney, Agent, or Firm*—Lee & Hayes, PLLC

(57) ABSTRACT

Various embodiments introduce the notion of a replication entity which implements a highly scalable file replication system. In one embodiment, the replication entity resides in the form of a scalable replication service. In at least some embodiments, the replication service provides a "drive in the sky" facility that can be used by individuals, such as subscribers, to synchronize their individual machines, such that their files are automatically replicated to a safe and always-on location. Alternatively or additionally, individuals such as subscribers can also access their files via a web-based interface when they are away from their machines.

20 Claims, 9 Drawing Sheets

U.S. PATENT DOCUMENTS

2003/0182319 A1* 9/2003 Morrison .................... 707/200
2004/0267843 A1* 12/2004 Dinh et al. .................. 708/204
2005/0027757 A1* 2/2005 Kiessig et al. ............. 707/204
2005/0071389 A1* 3/2005 Gupta ........................ 707/204
2005/0091287 A1* 4/2005 Sedlar ........................ 707/200
2005/0160120 A1 7/2005 Todd et al.
2005/0203962 A1* 9/2005 Zhou et al. ................. 707/200
2005/0262173 A1* 11/2005 Choquier et al. ............ 707/204
2006/0112244 A1* 5/2006 Buah et al. ................. 711/162
2006/0179082 A1* 8/2006 Boyd et al. ................ 707/203
2006/0235893 A1* 10/2006 Armangau et al. .......... 707/200
2006/0248038 A1* 11/2006 Kaplan et al. ................ 707/1
2006/0294164 A1* 12/2006 Armangau et al. .......... 707/205

OTHER PUBLICATIONS

Windows Server 2003 R2: Extending Support for Branch Offices, May 2005, pp. 1, 5.
Extended European Search Report, mailed on Dec. 29, 2009, from application No. PCT/US2006049663, 8 pages.

* cited by examiner

SCALABLE FILE REPLICATION AND WEB-BASED ACCESS

BACKGROUND

Multi-master file replication systems have been built for many years using various approaches, such as state-based or event-based replication. Typically, these systems will synchronize a portion of the file system between two or more computing devices (nodes), such that changes made to files or directories on one node will be propagated to the other nodes.

Many times, the computing devices on which replication occurs tend to be computers that are not permanently accessible, either because the computing devices may not be running or may be disconnected from the Internet. Accordingly, in these environments, users can typically only access their replicated files when they have access to their computing device. Hence, the user who travels a great deal may experience great difficulties in accessing their files.

SUMMARY

Various embodiments introduce the notion of a replication entity which implements a highly scalable file replication system. In one embodiment, the replication entity resides in the form of a scalable replication service. In at least some embodiments, the replication service provides a "drive in the sky" facility that can be used by individuals, such as subscribers, to synchronize their individual machines, such that their files are automatically replicated to a safe and always-on location. Alternatively or additionally, individuals such as subscribers can also access their files via a web-based interface when they are away from their machines.

DETAILED DESCRIPTION

Overview

Figure 1:
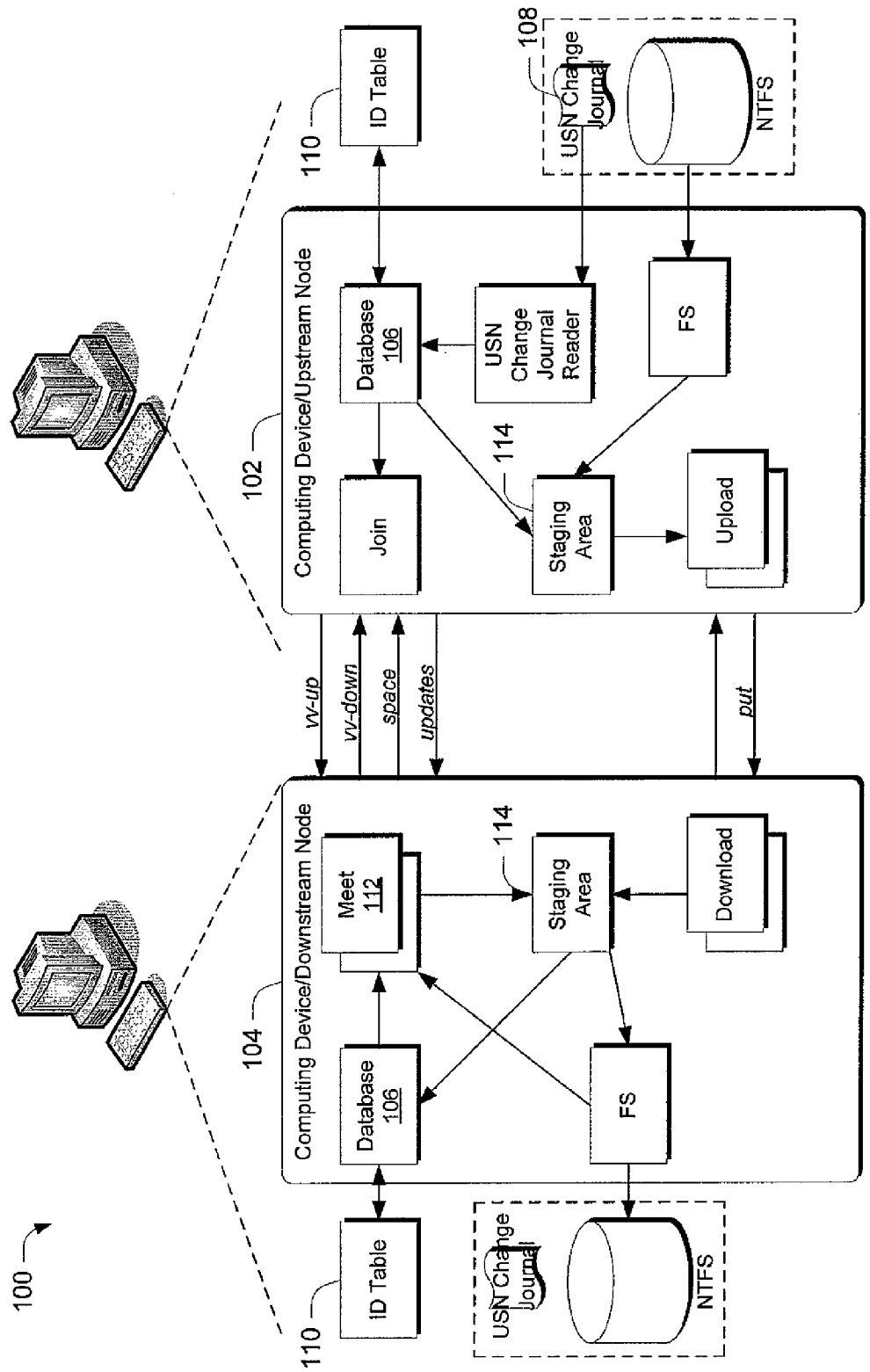
FIG. 1 provides a high-level overview of the components making up a typical state-based replication system.

The various embodiments described below introduce the notion of a replication entity which implements a highly scalable file replication system. The replication entity can reside in any suitable form such as in a service or replication hub or hubs.

In the example used in this document, the replication entity resides in the form of a scalable replication service. In at least some embodiments, the replication service provides a "drive in the sky" facility that can be used by individuals, such as subscribers, to synchronize their individual machines, such that their files are automatically replicated to a safe and always-on location. Alternatively or additionally, individuals such as subscribers can also access their files via a web-based interface when they are away from their machines.

The inventive embodiments address problems associated with scaling replication services to a very large number of subscribers. For example, simply scaling files system volumes to tens or hundreds of petabytes (PB) of storage poses significant cost, scalability, management, and reliability challenges, as will be appreciated by the skilled artisan. Stores that offer ideal characteristics in terms of scalability, management, and reliability can be built, but they will typically not have full file system semantics, due to the complexities associated with providing such semantics at that scale. Further, file system replication systems typically keep some replication metadata on the side. Since this metadata is updated separately from the file system update path, it can (and often does) get out of sync with the actual file system contents. Should that be the case, replicators will typically rescan the entire file system to rebuild an authoritative copy of the metadata. A rescan (especially if it occurs relatively frequently) can be a very onerous operation in a scalable service.

Accordingly, in at least some of the embodiments described below, these and other issues are addressed through a design that does not use a file system in the service. Instead, the design is based on using a scalable, self-managing, and reliable binary large object (blob) store (also called a "scalable file store" below) that does not provide full file system semantics. For instance, not providing full file system semantics may mean not supporting one or more of the following: a hierarchical file namespace, logical file names, file update operations, file truncation or extension, sparse files, file locking, or a filesystem change journal. When the "sky" node receives a file from one of the subscriber nodes, the file is received as a binary large object (blob) containing both actual file data and meta-data. Instead of unpacking that blob and storing it in a file system, however, the sky node simply stores it into the scalable blob store.

Additionally, in at least some embodiments, the replication metadata is merged with or stored alongside the scalable file store metadata. Thus, any updates to the blob store (whether originating from replication with one of the subscriber machines, or due to changes made via the web interface) can transact both the blob store metadata and the replication metadata at the same time. This mitigates synchronization issues between the replication metadata and the blob store and can thus obviate the need for rescans.

To provide some context for the discussion of scalable file replication below, consider the following on state-based replication. It is to be appreciated and understood that while the inventive embodiments are described in the context of state-based replication, the techniques described herein can also be applied to other types of replicators, such as event-based replicators.

State-Based Replication

File replicators are used to synchronize the content of file systems between two or more machines (computing devices), or "nodes". Any modifications performed to the file system on one of the nodes will be propagated to the other nodes. Replicators are designed to deal with all possible race conditions, such as conflicting updates to the same file on multiple nodes and the like. The node file systems can be any of the usual ones, such as NTFS, FAT, XFS, etc.

FIG. 1 provides a high-level overview of the components making up a typical state-based replication system generally at 100. Here, there are two nodes—an upstream node 102 and a downstream node 104. The nodes are engaged in unidirectional synchronization, from the upstream 102 to the downstream 104. To achieve bidirectional synchronization, nodes 102 and 104 can play both upstream and downstream roles at the same time.

File system modification events are processed locally on each node and accumulated in that node's replication metadata database 106. In the case of NTFS, the file system modification events can be read out of the file system's change journal 108, which records all file creations, deletions, and modifications. Other file systems may have different notification mechanisms. The node database's ID table 110 records the replication metadata for each of the replicated files and directories. This metadata is needed in addition to the actual file system data to efficiently determine what files need to be synchronized between two nodes and to identify and resolve conflicts and file moves.

In this example, upstream node 102 serves replicated content and the downstream node 104 receives replicated content. The vv-up and vv-down arrows signify communication between the nodes, such as the exchange of version vectors, which is designed to ensure that a minimum amount of updates can flow from the upstream node 102 to the downstream node 104. The space and updates arrows signify a credit system whereby the downstream node 102 can control the number of updates it receives from the upstream node 104 following a version vector exchange.

Downstream node 104 processes the updates using meet component 112 and decides, depending on the nature of the updates to the file, whether to download or delete files, as will be appreciated by the skilled artisan. When node 104 decides to download a file, it retrieves the file contents from upstream node 102 and places the file contents in a staging area 114. Files are exchanged between nodes using a get and put protocol.

The other components in this picture consist of the file system interface (FS) and the database 106 that contains metadata on what is on the FS. The database also contains identifiers that are global to all replicated nodes.

With regard to ID Table 110, consider now, in Table 1 just below, an overview of the main replication metadata that is stored in the ID Table 110.

TABLE 1

| Column Name | Size (byte) | Type | Description |
| --- | --- | --- | --- |
| UidMachine | 16 | GUID | Machine GUID of unique identifier |
| UidVersion | 8 | VERSION | Version of unique identifier |
| GvsnMachine | 16 | GUID | Machine GUID of GVSN |
| GvsnVersion | 8 | VERSION | Version of GVSN |
| ParentMachine | 16 | GUID | Machine GUID of parent UID |
| ParentVersion | 8 | VERSION | Version of parent UID |
| Clock | 8 | FILETIME | Clock value (used to resolve file conflicts.) |
| CreateTime | 8 | FILETIME | Creation time. (used to resolve directory conflicts.) |
| Name | 522 | WCHAR[ ] | Resource name. It is a variable length column. |

The first two fields (UidMachine and UidVersion) give the unique global identifiers for a resource. The unique global identifier does not change when a resource is updated—it is invariant under the lifetime of the resource.

Contrarily, the global version sequence numbers (i.e. GvsnMachine and GvsnVersion) change whenever a given resource is updated. The GvsnMachine field identifies the partner that made the change, and the GvsnVersion field identifies a timestamp of the change.

The ParentMachine and ParentVersion fields identify the unique identifier of the parent directory. Specifically, since files are being replicated in a file system, there is an ancestral relationship where the objects were replicated. The Parent fields are the fields used to identify a directory in which a file resides.

The Clock field provides an update time of a resource and is used to resolve update conflicts. Specifically, if there are two concurrent updates, the updates will typically have different clocks which are then used to resolve conflicts.

The CreateTime field is also used to resolve directory conflicts. The creation time of a fixed resource does not change.

The Name field is the name of a resource as it appears in the file system. This is not the fully qualified name, but rather the name relative to a parent.

Periodically, as shown in FIG. 1, nodes synchronize with each other, at which point they compare their databases 106 to decide what information needs to be sent. This database comparison operation is called a vvjoin. State-based replicators rely on the ability to efficiently perform vvjoins in order to perform synchronization, as will be appreciated by the skilled artisan.

The synchronization core is comprised of a handshake between two partners: the upstream and downstream nodes. As will be appreciated by the skilled artisan, synchronization always occurs from the upstream node to the downstream node. For bi-directional synchronization, two handshakes are needed. The two partners start the handshake by exchanging version vectors, which are a summary of the GVSN's of all of their files, as reflected in their respective ID tables. Based on the version vector received from its downstream partner, the upstream node determines what information (i.e. files) it has that its downstream partner has not yet seen. The upstream node then starts sending updates (i.e. information about files that downstream has not yet seen), and downstream node downloads content based on these updates.

As indicated in FIG. 1, the upstream and downstream nodes use a staging area 114 to effect downloads and uploads. This area is a separate directory that is used to hold marshaled versions of the file(s) that are uploaded or downloaded. The staging area is used to handle sharing violations in the downstream's replica set, partial downloads, and off-band copying, as will be appreciated by the skilled artisan.

Figure 2:
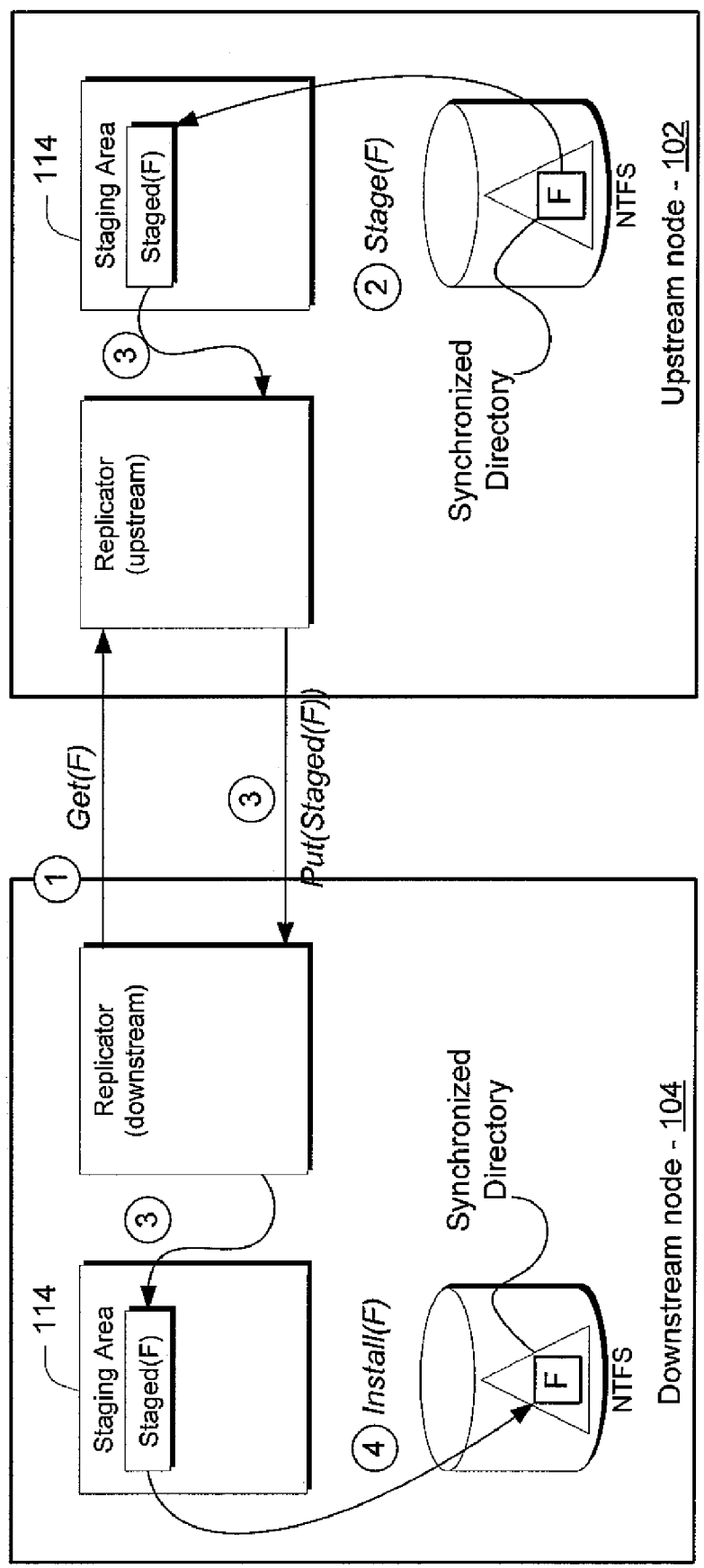
FIG. 2 illustrates the process of replicating one file F, including the use of staging areas.

FIG. 2 illustrates the process of replicating one file F, including the use of staging areas 114. Here, the downstream node 104 sends, at 1, a request Get(F) to the upstream node 102 to prepare for the transfer of file F. At 2, the upstream node 102 marshals (or "stages") the data and metadata of file F into a binary large object (blob) Staged(F) and stores this blob in the staging area 114. For NTFS files, Staged(F) includes the main data stream of file F, any alternate data streams, as well as the replicated metadata, such as the file creation time and access control list (ACL). Some of the NTFS metadata, such as the last modified time, may not be replicated and is thus not included in Staged(F). The upstream node then sends, at 3, Staged(F) to the downstream node 104 via a response Put(Staged(F)). Also at 3, the downstream node 104 stores Staged(F) in its staging area 114. Finally, at 4, the downstream node 114 unmarshals Staged(F) to produce its own copy of the replicated file F that it installs in its own copy of the synchronized directory.

Figure 3:
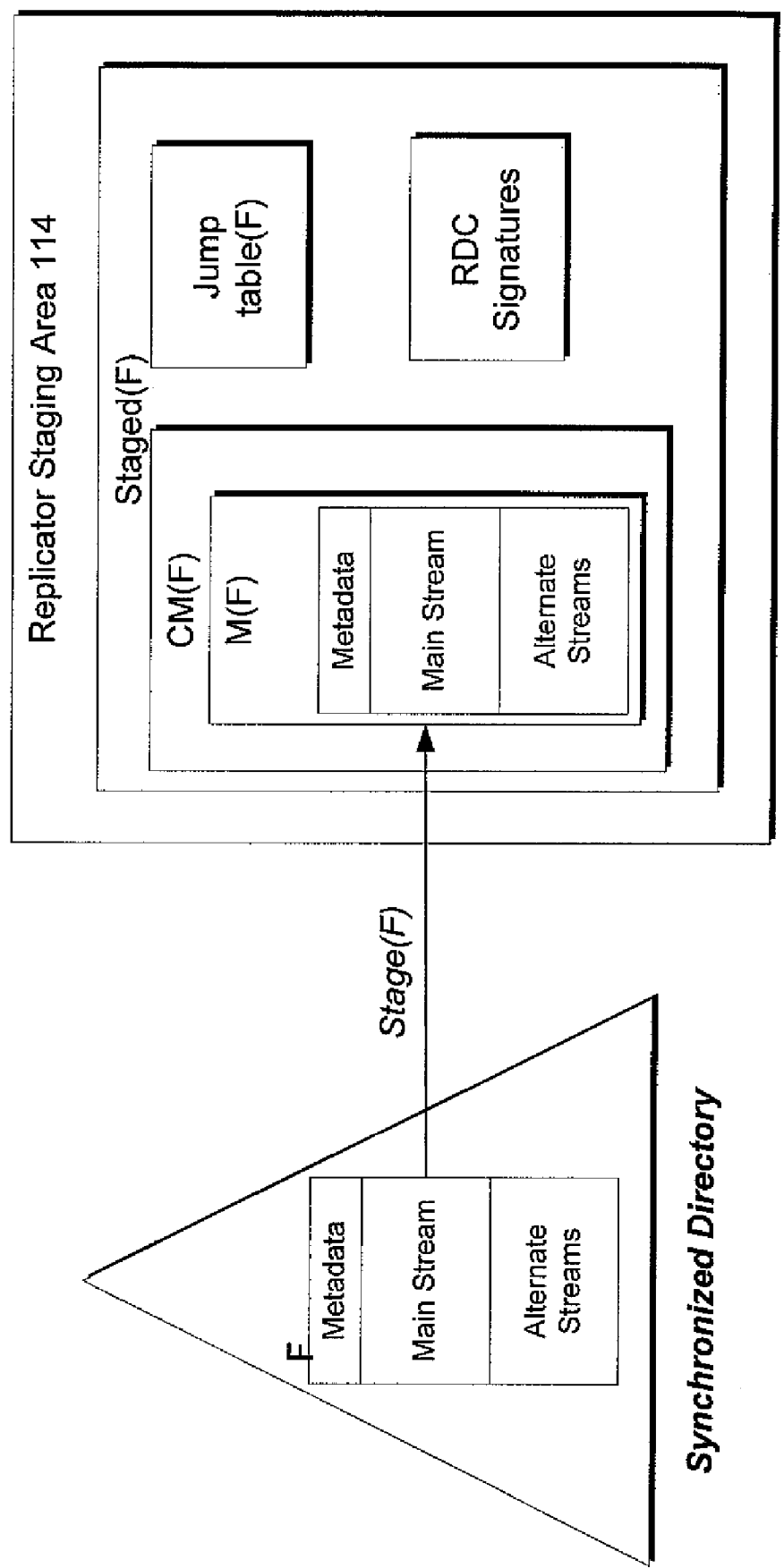
FIG. 3 illustrates the components of a staged file in more detail.

FIG. 3 illustrates the components of Staged(F) in more detail. In addition to a compressed marshaled representation CM(F) of the file F, these components may include other meta-data. For instance, the additional metadata may be made up of signatures (i.e. Remote Differential Compression, or RDC, signatures) that are used for the differential transfer of file F, as well as a jump table that is used to efficiently seek in the compressed version of the file. This other meta-data may be stored in an alternate sparse stream of the NTFS file representing Staged(F).

Upon receiving the meta-data for a remote resource, a node must determine whether the file contents associated with the resource and its particular version is admissible. In particular, a file must pass the following filters:

1. If there are no directories corresponding to the parent UID, it is not possible to accept file contents in the file system. Similarly, if the meta-data corresponding to parent UID indicates that the parent directory has been deleted, known as a tombstone, it is not possible to accept the file contents, unless the deleted parent can be re-animated by downloading it from the peer.
2. If a file or directory exists on the file system, under the same parent, with a different UID, but same name, it is not possible to accept the file contents in the file system unless renaming the conflicting files apart, or outright deleting one of the resources.
3. If the ancestral relationship imposed by the parent introduces a cycle when compared with the current file system state on a node, it is not possible to accept the file contents because current NTFS file system semantics impose a directed acyclic graph structured hierarchy.

An update that passes the above tests may still be conflicting, in the sense that it was made independently of the file version stored locally. This scenario is common when collaborators edit the same document at the same time on two different nodes. However, either version may be installed on a file system, so the update conflict does not violate any file system constraints.

Having discussed file replication, consider now scalable file storage.

Scalable File Storage

Scalable file storage systems have been built for many years using various approaches, including namespace partitioning (e.g. AFS, DFS), metadata and blob decoupling (e.g. Google's GFS), and clustered file systems (e.g. Sistina's GFS). The techniques and approaches described in this document are applicable to scalable file storage that decouples the metadata and blobs, although the techniques described herein could also be applied to other types of scalable file storage.

Figure 4:
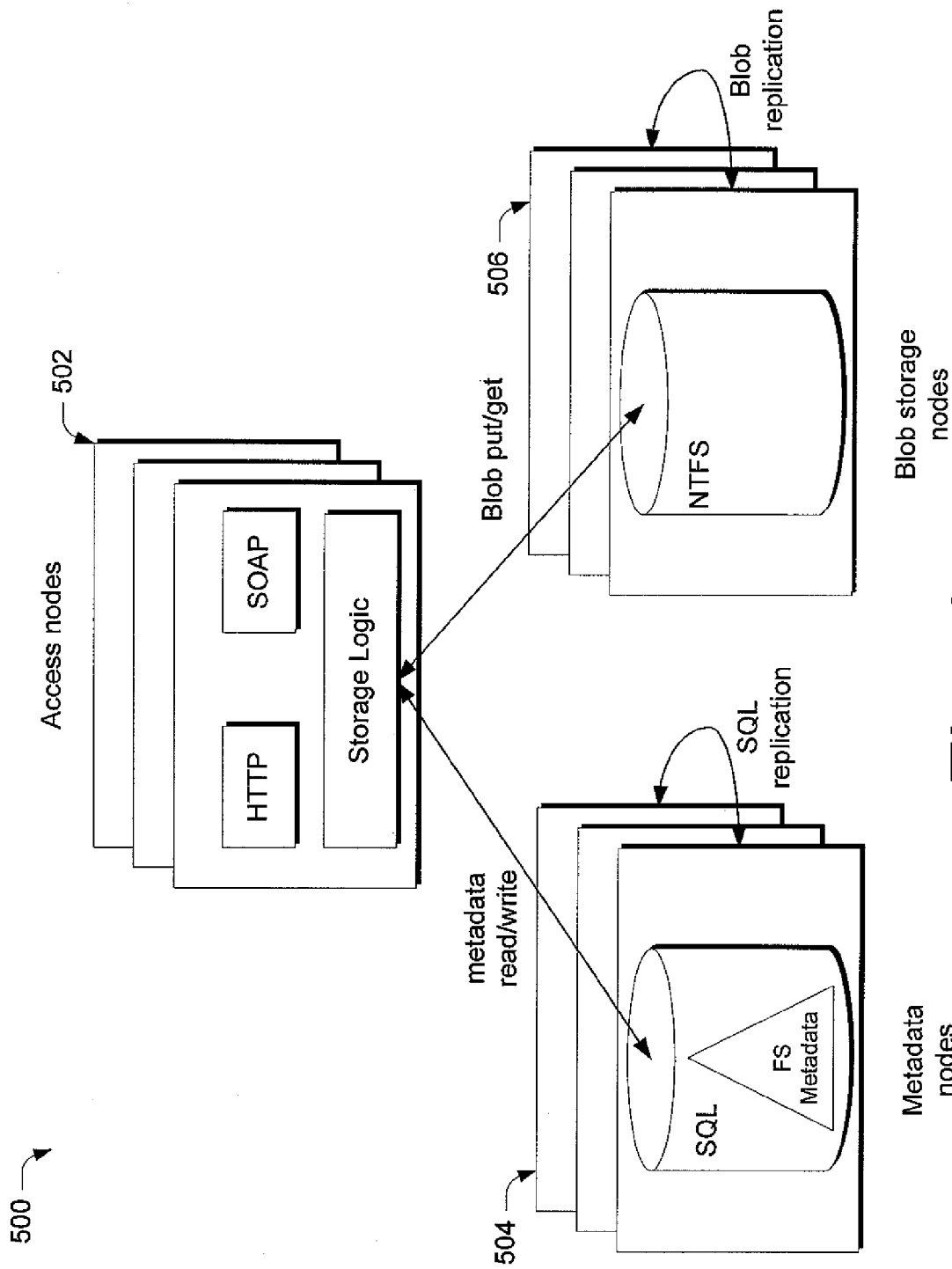
FIG. 4 provides a high-level overview of the components of a system making up a scalable file store that decouples the file system metadata and blob storage.

FIG. 4 provides a high-level overview of the components of a system making up a scalable file store that decouples the file system metadata and blob storage, generally at 500. In this example, system 500 includes one or more access nodes 502, one or more metadata nodes 504, and one or more blob storage nodes 506.

The scalable file system metadata is stored on one or more nodes 504 optimized for metadata storage and indexing. The metadata is replicated for availability and reliability. A SQL database is commonly used as the metadata store.

The data streams for the files are typically stored on one or more nodes 506 optimized for blob storage, as will be appreciated by the skilled artisan. Scalable blob stores generally provide reduced storage semantics as compared to a traditional file system, typically only providing object put, get, and delete operations. Objects written to the blob store are replicated for availability and reliability.

Clients perform scalable file system operations by calling remote HTTP and SOAP APIs on an access node 502. Access node 502 includes storage logic that is designed to effect storage of a file's data stream in blob storage node 506, and its associated metadata in metadata node 504, as described in more detail below.

Figure 5:
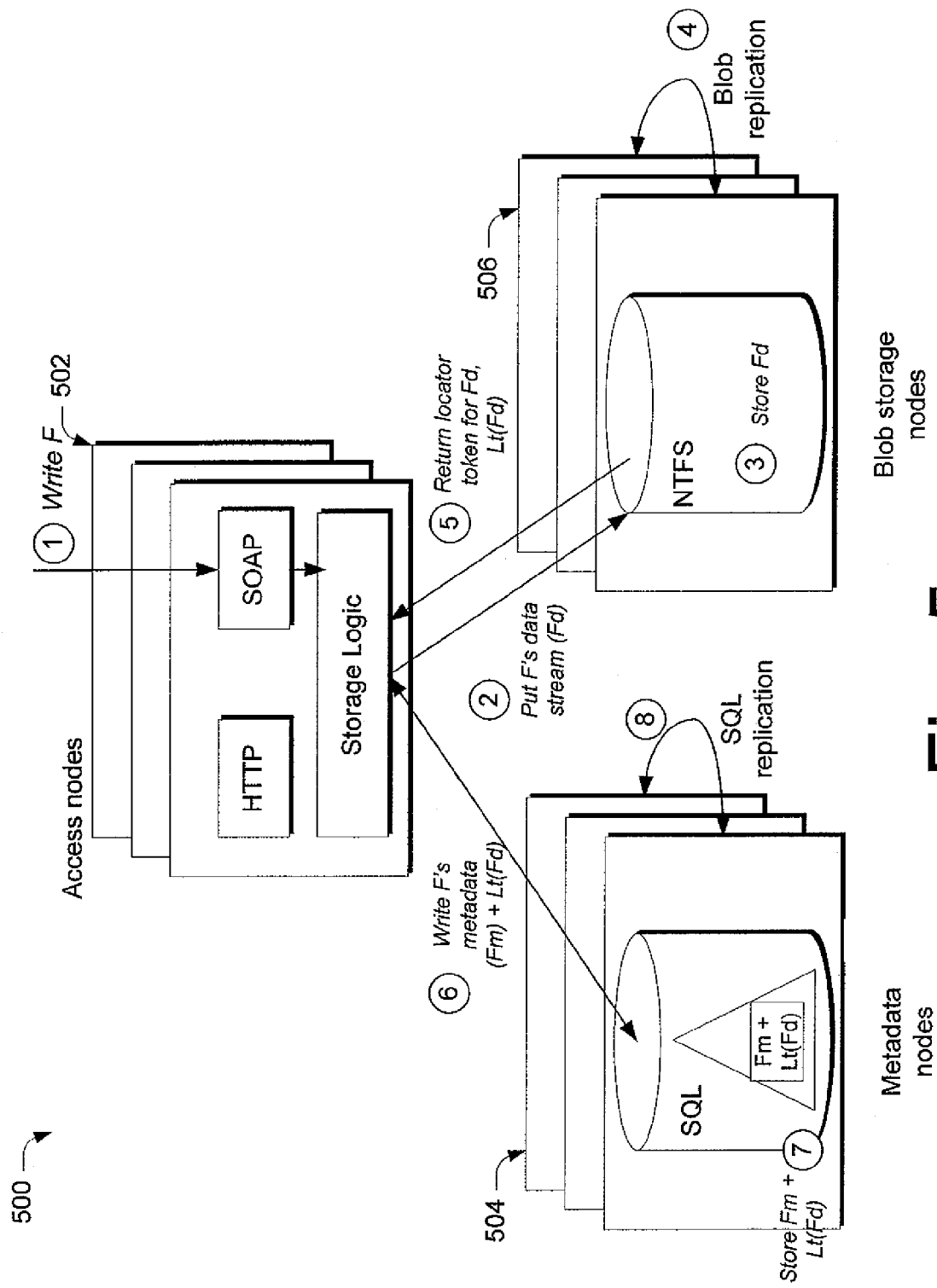
FIG. 5 illustrates the process of storing one file F in FIG. 4's system.

FIG. 5 illustrates the process of storing one file F in FIG. 4's system. The individual file-storing steps are illustrated by encircled numbers.

A storage client first sends, at 1, a write request for F to an access node 502. The access node 502 sends, at 2, the data stream for F (Fd) to the scalable blob store 506 using a put operation. Fd is stored, at 3, on at least one node of the scalable blob store 506. Fd may be stored as an NTFS file, or as a chunk in some larger file that groups together several blobs. Fd may be replicated, at 4, within the blob store 506 prior to completing the put operation to guarantee durability of the put.

The blob store 506 returns, at 5, a locator token for Fd, Lt(Fd). The locator token can later be used as an argument to the blob store's get operation to locate and retrieve the contents of Fd.

The access node 502 sends, at 6, a metadata write request to the metadata store 504 to store both the file system metadata Fm, and locator token for F. Fm and Lt(Fd) are then stored, at 7, in the metadata store 504. SQL replication may be used, at 8, to replicate this information to guarantee its durability.

For retrieving file F, the above process is followed in reverse. That is, the locator token is first retrieved by an access node 502 from the metadata store 504 and then used to locate the appropriate blob in blob store 506.

A file replication service on nodes with associated file systems will have to check conditions 1, 2, and 3 described above. However, a replication service on a file system-less proxy does not need to take these conditions into account as it only stores objects in an object store that does not require file system constraints. This provides increased scalability and delayed conflict resolution.

Exemplary Embodiment—Sky Drive Architecture

Figure 6:
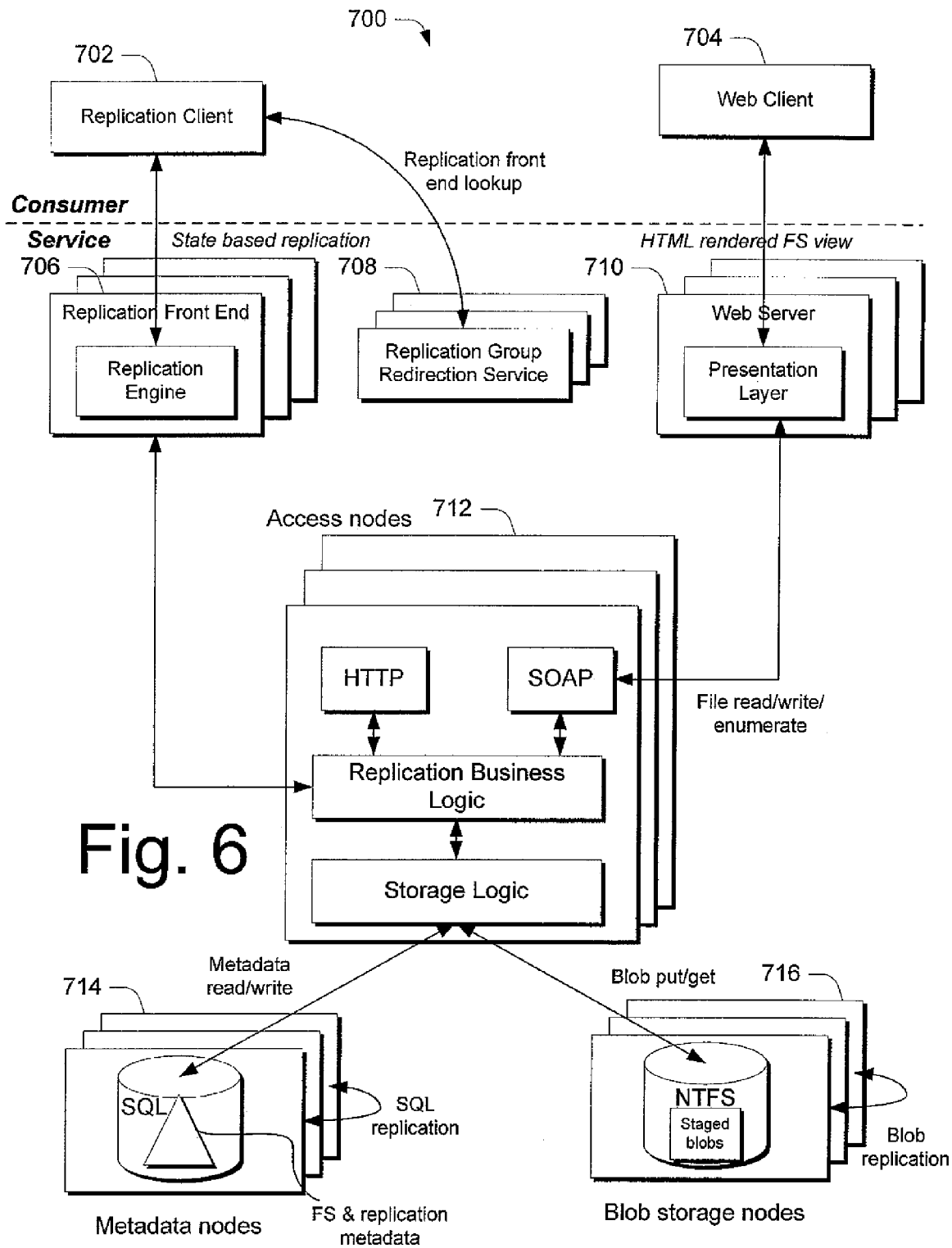
FIG. 6 illustrates an exemplary architecture in accordance with one embodiment.

FIG. 6 illustrates, generally at 700, an exemplary Sky Drive architecture in accordance with one embodiment. In this embodiment, the architecture provides a as scalable service for file replication and web-based access by combining a state-based replication system with scalable file storage. The architecture can be implemented in connection with any suitable hardware, software, firmware or combination thereof. In one embodiment, various components of the architecture are implemented in software in the form of computer-executable instructions that reside on a computer-readable medium.

In this particular embodiment, architecture 700 includes, by way of example and not limitation, consumer-side components and service side components which are delineated by the dashed line.

The consumer-side components include one or more replication clients 702 and one or more web clients 704. The service side components include one or more replication front ends 706 each of which includes a replication engine, one or more replication group redirection services 708, one or more web servers 710 that include a presentation layer, one or more storage access nodes 712, one or more metadata nodes 714 and one or more blob storage nodes 716. Storage access nodes include, in accordance with one embodiment, HTTP and SOAP APIs as mentioned above, along with replication business logic and storage logic which are described in more detail below.

In this embodiment, the file system metadata stored in the scalable file system's metadata nodes is augmented with the replicator's metadata described in Table 1. Updates to the unified metadata are made by replication business logic running in the access node 712 for the scalable file service so that both pieces of metadata may be transacted together. Data streams for files are stored in the scalable blob store 716 in their staged format, as described in FIG. 3. This is done to optimize the replication process with consumer replication clients.

Consumer replication clients 702 perform state based replication with an instance of a state based replication engine hosted on replication front end 706. Consumers' replication clients participate in bidirectional replication with the replication service using the same replication protocols utilized when replicating with another consumer based replicator running on top of a regular file system, thus making replicating with the replication service backed by a blob store functionally equivalent to replication using a traditional file system.

Consumers are directed to a specific instance of a replication front end 706 via a replication group redirection service 708, thus ensuring that all replication for a set of files is performed on a single instance of the state based replication engine regardless of the number of consumers actively performing replication on that set of files. The affinity between file sets and a particular instance of a replication engine is utilized to enable in-memory locking and ordering of updates on the replication front ends 706, in order to reduce the number of update conflicts. Typically, the number of consumers replicating a given set of files will be small, i.e. not exceed a few hundred.

Web based clients 704 communicate with a presentation layer hosted on a web server 710 that renders the file system in HTML. The presentation layer translates the HTTP requests from the web based clients 704 and forwards these translated requests to scalable file service access node 712. The replication business logic embedded in the scalable file service access node 712 marshals files into a staged file format (e.g., as described in FIG. 3) during file writes (or HTTP PUT requests) as a result of a web upload, and unmarshals the staged files during read requests (or HTTP GET requests) resulting from a web download.

Figure 7:
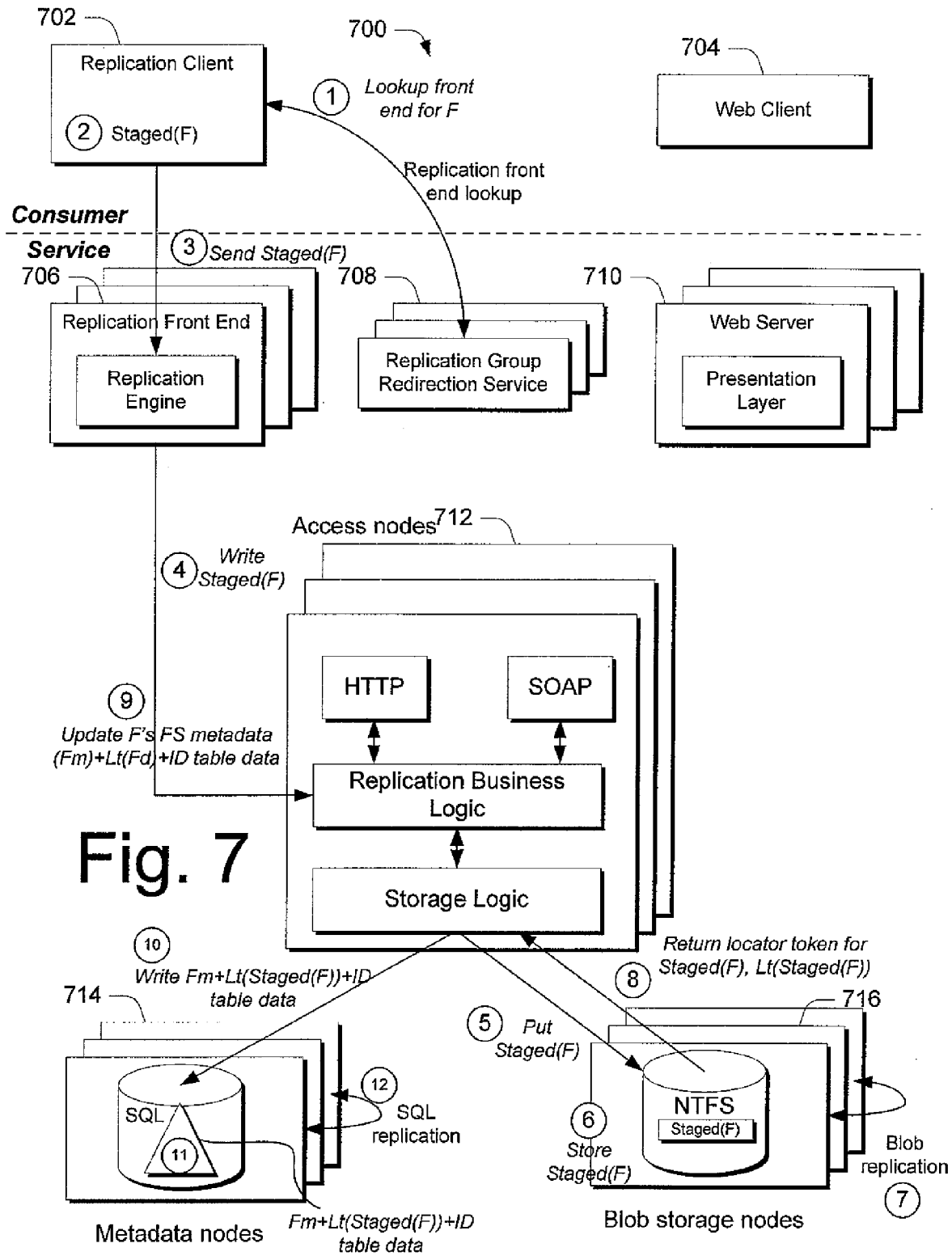
FIG. 7 illustrates a control flow for replicating a file from a consumer replication client to the architecture of FIG. 6, in accordance with one embodiment.

Consider FIG. 7 which illustrates, generally at 700, a control flow for replicating a file from a consumer replication client to the sky drive architecture in accordance with one embodiment. The various steps of the replication process are designated by encircled numbers.

In this example, the replication client 702 contacts, at 1, the replication group redirection service 708 to determine which replication front end to use to replicate file F. The replication client 702 then marshals file F, at 2, to produce a staged file, represented as Staged(F). One example of how this can be done is described in connection with FIGS. 3 and 4 above. The client then sends, at 3, Staged(F) to the appropriate replication front end 706. The replication front end sends a write request, at 4, for Staged(F) to a storage access node 712. The storage access node 712 then sends, at 5, Staged(F) to the scalable blob store 716. Staged(F) is stored, at 6, on at least one blob storage node 716, by requesting a put operation. Staged(F) may be replicated, at 7, within the blob store prior to completing the put request to guarantee durability of the put.

The blob store returns, at 8, a locator token for Staged(F), Lt(Staged(F)). The replication front end 706 then sends a metadata write request, at 9, to the storage access node 712 to write the replication metadata (the ID_Table data in FIG. 2), the file system metadata Fm for F, and the locator token Lt(Fd) for Staged(F). The storage access node 712 forwards, at 10, the write request to the metadata store 714. The write is committed, at 11, on at least one metadata node. SQL replication may be used, at 12, to guarantee the durability of the transaction in the presence of metadata node failures.

In one implementation, the consumer replication client 702 may upload the entire file F during step 3. In another implementation, file F may be streamed from the consumer replication client 702 to the scalable blob store 716, thus performing steps 3 through 5 as a pipelined operation. If an error occurs during steps 3 through 5, including, but not limited to: network disconnection, replication client failure, or a failure within the service, the replication front end 706 may attempt to store the information necessary to resume the transfer of Staged(F) with the consumer replication client at a later time. This information includes storing the partially transferred version of Staged(F) in the blob storage 716 and metadata about the partially transferred version of Staged(F) in the metadata store 714, including the client's identity and any other file version information required to resume the replication process.

Figure 8:
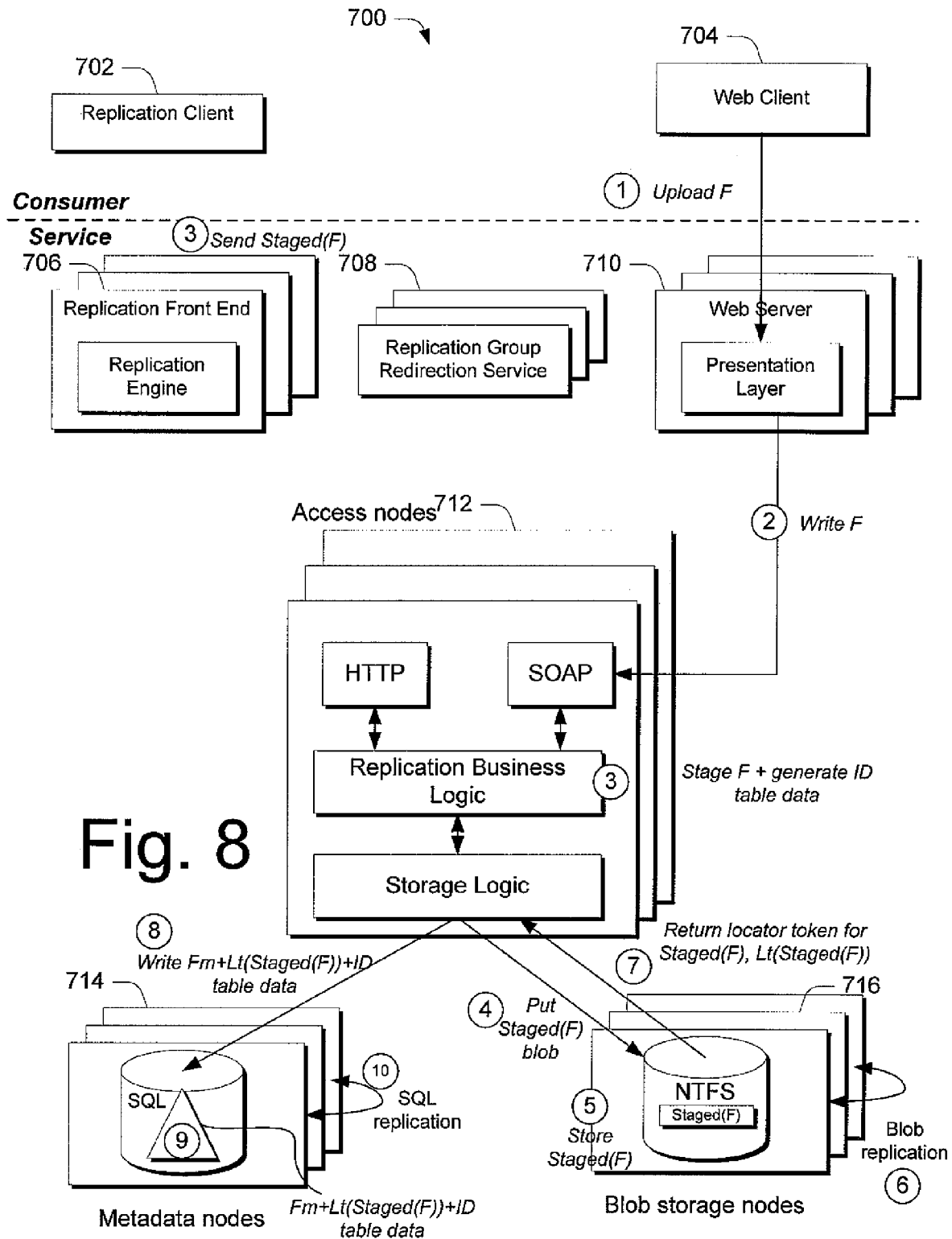
FIG. 8 illustrates a control flow for uploading a file from a web client to the architecture of FIG. 6 in accordance with one embodiment.

Consider now FIG. 8 which illustrates a control flow for uploading a file from a web client 704 to the sky drive architecture in accordance with one embodiment. The various steps of the replication process are designated by encircled numbers.

In this example, the web client 704 uploads, at 1, file F to a web server 710. Responsively, web server 710 writes, at 2, file F to a storage access node 712. The replication business logic on the storage access node 712 produces, at 3, a staged version of F, Staged(F), including generating ID Table information, similar to the manner described in FIG. 3 above. The storage access node 712 then sends, at 4, Staged(F) to the scalable blob store 716. Staged(F) is stored, at 5, on at least one blob storage node 716. Staged(F) may be replicated, at 6, within the blob store 716 prior to completing the put request to guarantee durability of the put. The blob store 716 then returns, at 7, a locator token for Staged(F), Lt(Staged(F)).

The replication logic layer in the storage access node 712 sends a metadata update request, at 8, to the metadata store 714 containing the file system metadata Fm for F, the replication metadata (the ID_Table data in FIG. 2), and the locator token Lt(Staged (F)) for Staged(F). The write is committed, at 9, on at least one metadata node 714. SQL replication may be used, at 10, to guarantee the durability of the transaction in the presence of metadata node failures.

If the metadata update in step 8 fails due to a transactional conflict between updates made by another web client or a consumer replication client, the replication logic layer in the storage access node retries the metadata update.

In one implementation, the web client 704 may upload the entire file F during step 1. In an another implementation, file F may be streamed from the web client 704 to the scalable blob store 716, thus performing steps 1 through 5 as a pipelined operation.

Figure 9:
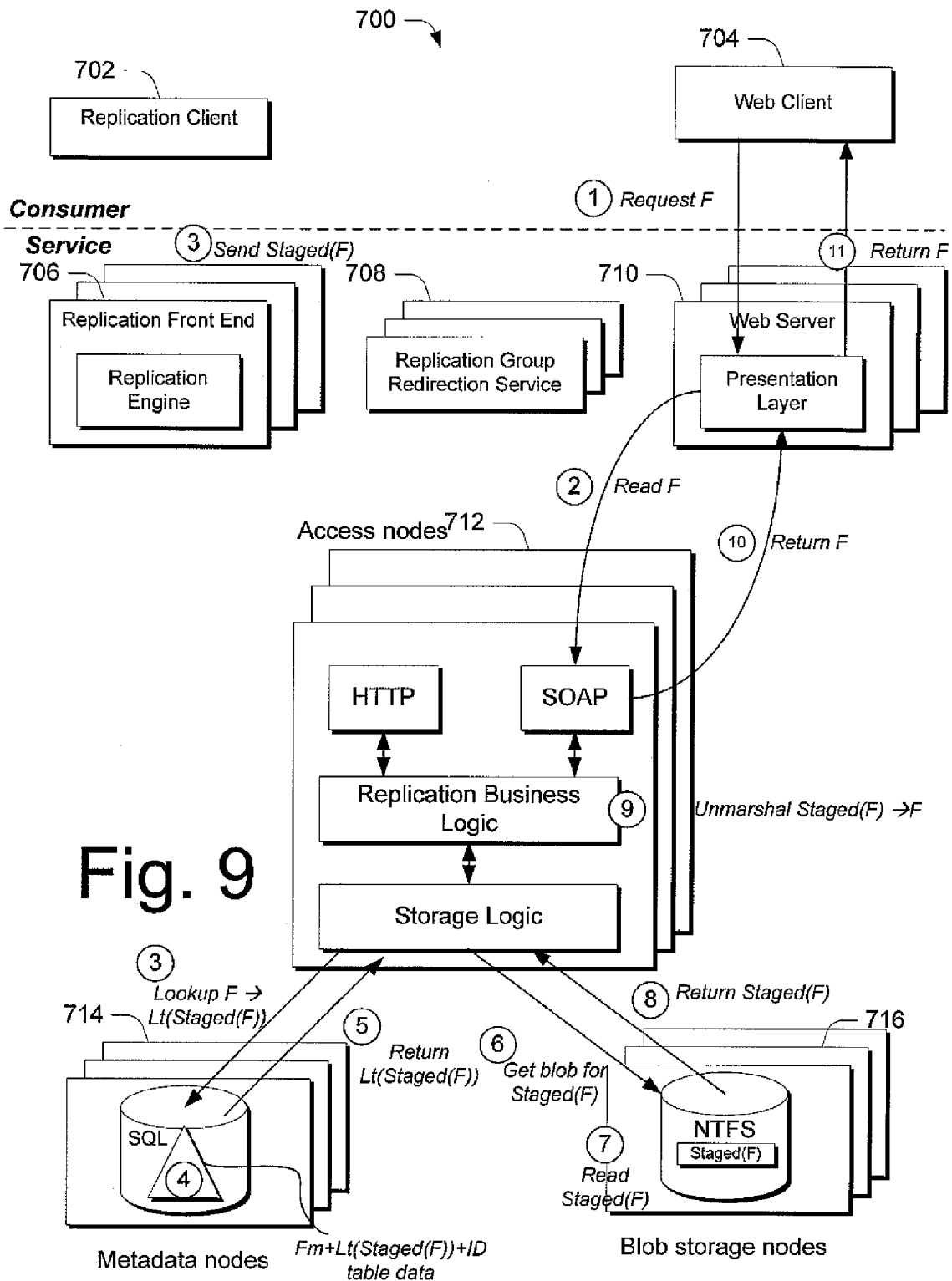
FIG. 9 illustrates a control flow for downloading a file from the architecture of FIG. 6 to a web client in accordance with one embodiment.

Consider now FIG. 9 which illustrates a control flow for downloading a file from the sky drive architecture to a web client in accordance with one embodiment. The various steps of the download process are designated by encircled numbers.

In this example, the web client 704 requests, at 1, file F from a web server 710. The web server 710 requests, at 2, file F to be read from storage access node 712. The storage logic on the storage access node 712 performs a lookup, at 3, of file F to obtain Lt(Staged(F)) using the metadata store 714. The metadata store 714 reads, at 4, the metadata (Fm, Lt(Staged (F), ID table data) for F from the SQL database to map F to Lt(Staged(F)). The metadata store 714 returns, at 5, Lt(Staged (F)) to the storage access node 712. The storage logic on the storage access node 712 uses Lt(Staged(F)) and issues a get request, at c6, for Staged(F) from the blob store 716. The blob store 716 reads, at 7, Staged(F) from storage and returns, at 8, Staged(F) to the storage access node 712.

The replication business logic on the storage access node 712 unmarshals, at 9, Staged(F), thus producing F. The storage access node 712 then returns file F, at 10, to the web server 710 which, in turn, returns file F, at 11, to the web client 704.

In an alternative implementation of FIGS. 9 and 10, the web client 704 runs business logic, such as that which can be embodied as an ActiveX control, to perform the marshaling and unmarshalling of Staged(F). This alleviates the need to marshal and unmarshal Staged(F) on the storage access node 712, thus enabling the system to read and write Staged(F) end-to-end, reducing resource consumption on the storage access node 712.

Extensions

As noted above, a replication entity in the form of a replication hub can be used to implement the functionality described above. That is, one or more always-on replication hubs may be deployed to provide store-and-forward replication and higher network bandwidth than typical replication clients. Such hubs would typically be deployed in commercial data centers with significantly higher network connectivity than the typical replication node. The replication hubs can either be file-system less, thus providing replication of only the data streams for files, or replicate all of the file system metadata as described in the architecture section above.

Conclusion

The various embodiments described above provide a replication entity which implements a highly scalable file replication system. In at least some embodiments, a replication service provides a "drive in the sky" facility that can be used by individuals, such as subscribers, to synchronize their individual machines, such that their files are automatically replicated to a safe and always-on location. Alternatively or additionally, individuals such as subscribers can also access their files via a web-based interface when they are away from their machines. The inventive embodiments address and overcome at least some problems associated with scaling replication services to a very large number of subscribers. In at least some embodiments, these problems are addressed by virtue of a scalable, self-managing, and reliable binary large object (blob) store, as described above. Additionally, in at least some embodiments, the replication metadata is merged with scalable store metadata. Thus, any updates to the blob store (whether originating from replication with one of the subscriber machines, or due to changes made via the web interface) can transact both the blob store metadata and the replication meta-data at the same time. This mitigates synchronization issues between the replication metadata and the blob store and can thus obviate the need for rescans.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A system comprising:
   a processor; and
   a memory coupled to the processor, the memory comprising computer-program instructions executable by the processor to perform operations comprising:
   replicating a file with a replication entity to produce a staged file by determining whether the staged file is acceptable to a file system via determinations comprising:
   in an event a directory corresponding to a unique global identifier (UID) of the parent resource is identified, contents of the staged file are accepted in the file system;
   in an event meta-data corresponding to the UID of the parent indicates that the directory corresponding to the UID of the parent resource has been deleted, contents of the staged file are accepted in the file system responsive to re-animating the deleted directory corresponding to the UID of the parent resource by downloading the directory corresponding to the UID of the parent resource from a peer;
   in an event meta-data corresponding to the UID of the parent indicates that the directory corresponding to the UID of the parent resource has been deleted and re-animating the deleted directory corresponding to the UID of the parent resource by downloading the directory corresponding to the UID of the parent resource from a peer is not successful, contents of the staged file are not accepted in the file system;
   in an event no directory corresponding to the UID of the parent resource is identified, contents of the staged file are not accepted in the file system;
   storing the staged file in a scalable binary large object (blob) store located on a first node, wherein the scalable blob store includes put, get, and delete operations in order to reduce storage semantics as compared to the file system, thereby minimizing file system constraints;
   receiving from the scalable blob store, a metadata write request to write:
   replication metadata,
   file system metadata for the staged file, and
   a locator token;
   performing the metadata write to obtain:
   the replication metadata,
   the file system metadata for the staged file, and
   the locator token;
   storing, in a scalable metadata store located on a second node, the replication metadata, file system metadata for the staged file, and the locator token for the staged file from the scalable blob store;
   using the locator token, in response to a web client request, to locate and retrieve a datastream associated with the staged file;
   merging the replication metadata and blob store metadata to facilitate combined transactions.

2. The system of claim 1, wherein the computer-executable instructions further comprise instructions for merging replication metadata with file metadata in the scalable metadata store.

3. The system of claim 2, wherein the replication entity is configured to, responsive to updates to the scalable blob store, transact both file metadata and replication metadata together.

4. The system of claim 3, wherein the replication entity is configured to receive at least some updates via a web interface.

5. The system of claim 1, wherein the replication entity comprises a service.

6. The system of claim 1, wherein the replication entity comprises one or more hubs.

7. The system of claim 1, wherein the replication entity is configured as a state-based replication entity.

8. A system comprising:
one or more replication front ends individual ones of which being associated with a file replication engine that is executable on one or more processors to provide state-based file replication via exchange of version vectors;
at least one scalable binary large object (blob) store for storing file data in a manner that does not require full file system semantics;
at least one scalable metadata store for storing associated file metadata and a locator token for the file data in the at least one scalable blob store, wherein the system is embodied as a service, and wherein a replication client can participate in bi-directional replication with the replication service using the same replication protocols that would be utilized when replicating with another replication client running on a file system; and
one or more scalable file service access nodes at least some of which being configured to:
marshal files into a staged file format, the staged file format comprising:
a compressed marshaled representation of a file,
a signature of the file for differential transfer of the file, and
a jump table for navigating in the compressed marshaled representation of the file, and
unmarshal staged files.

9. The system of claim 8, wherein said at least one scalable metadata store stores replication metadata that is associated with said file metadata.

10. The system of claim 9 further comprising one or more access nodes individual ones of which being configured to transact both the replication metadata and associated file metadata together.

11. The system of claim 8 further comprising one or more replication group redirection services to direct replication clients to a particular instance of a replication front end.

12. The system of claim 8 further comprising one or more servers individual ones of which hosting a presentation layer configured to communicate with one or more web clients and to present HTML file system views for the one or more web clients.

13. A computer-implemented method comprising:
receiving, with a replication entity via the computer, a staged file;
sending, via the computer, to a storage access node, a write request for the staged file;
sending, via the computer, the staged file to a scalable binary large object (blob) store, wherein the scalable blob store:
stores the staged file via a marshaled replicated blob; and
provides reduced storage semantics comprising object put, get, and delete operations;
receiving, via the computer, from the scalable blob store, a locator token for the staged file;
sending, via the computer, to the storage access node, a metadata write request to write replication metadata, file system metadata for the staged file, and the locator token;
forwarding, via the computer, the metadata write request to a scalable metadata store; and
committing, via the computer, said metadata write request on said scalable metadata store, wherein the committing of the metadata write request comprises storing the replication metadata, the locator token and the file system metadata in the scalable metadata store.

14. The method of claim 13 further comprising, prior to said act of receiving a staged file, receiving from a replication client, a communication and responsive to said communication, directing said replication client to a particular instance of a replication front end comprising a replication engine for replicating files.

15. The method of claim 13 further comprising uploading a file from one or more web clients to the replication entity.

16. The method of claim 13 further comprising downloading a file from the replication entity to one or more web clients.

17. The method of claim 13 further comprising:
utilizing the locator token, in response to a web client request, to locate and retrieve a datastream associated with the staged file.

18. The method of claim 17, wherein:
the scalable blob store and the scalable metadata store are located on separate nodes; and
the staged file is stored in the scalable blob store in a staged format as a result of marshalling.

19. The method of claim 18, wherein the reduced file system semantics do not support a hierarchical file namespace.

20. The method of claim 13, wherein the staged file includes a compressed marshaled representation of the file.

* * * * *